United States Patent
Chen

(10) Patent No.: US 9,141,137 B2
(45) Date of Patent: Sep. 22, 2015

(54) ELECTRONIC DEVICE WITH KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Zhou Chen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 225 days.

(21) Appl. No.: 13/710,730

(22) Filed: Dec. 11, 2012

(65) Prior Publication Data

US 2013/0148282 A1    Jun. 13, 2013

(30) Foreign Application Priority Data

Dec. 12, 2011    (CN) .......................... 2011 1 0411741

(51) Int. Cl.
    *G06F 1/16* (2006.01)
(52) U.S. Cl.
    CPC ............ *G06F 1/1624* (2013.01); *G06F 1/1601* (2013.01); *G06F 1/1607* (2013.01)
(58) Field of Classification Search
    USPC .............. 361/679.08, 679.17, 679.21, 679.27
    See application file for complete search history.

(56) References Cited

U.S. PATENT DOCUMENTS

| | | | | | |
|---|---|---|---|---|---|
| 4,704,604 | A | * | 11/1987 | Fuhs .......................... | 361/679.17 |
| 4,946,121 | A | * | 8/1990 | Troke .......................... | 248/201 |
| 5,062,609 | A | * | 11/1991 | Hames et al. ................ | 248/676 |
| 5,241,303 | A | * | 8/1993 | Register et al. ................ | 345/168 |
| 5,440,502 | A | * | 8/1995 | Register .................... | 361/679.17 |
| 5,539,615 | A | * | 7/1996 | Sellers ....................... | 361/679.12 |
| 5,615,854 | A | * | 4/1997 | Nomura et al. ............. | 248/287.1 |
| 5,673,169 | A | * | 9/1997 | Wicks ......................... | 361/679.4 |
| 5,786,983 | A | * | 7/1998 | Brenner et al. ............. | 361/679.4 |
| 6,325,346 | B1 | * | 12/2001 | Chang et al. .............. | 248/225.11 |
| 6,480,372 | B1 | * | 11/2002 | Vong et al. ................. | 361/679.09 |
| 6,667,759 | B2 | * | 12/2003 | Gerszberg et al. ......... | 348/14.01 |
| 6,768,635 | B2 | * | 7/2004 | Lai et al. ................... | 361/679.11 |
| 6,927,760 | B2 | * | 8/2005 | Chin et al. .................... | 345/168 |
| 7,068,497 | B2 | * | 6/2006 | Chu .......................... | 361/679.06 |
| 7,362,310 | B2 | * | 4/2008 | Wilk et al. ..................... | 345/168 |
| 7,633,745 | B2 | * | 12/2009 | Sakakibara et al. ...... | 361/679.11 |
| D611,046 | S | * | 3/2010 | Smith et al. .................... | D14/331 |
| 8,023,256 | B2 | * | 9/2011 | Walker et al. ............. | 361/679.27 |
| 8,320,113 | B2 | * | 11/2012 | Xiao ......................... | 361/679.27 |
| 8,649,166 | B2 | * | 2/2014 | Wu et al. ................... | 361/679.27 |
| 2003/0107871 | A1 | * | 6/2003 | Vathulya ....................... | 361/681 |
| 2007/0086155 | A1 | * | 4/2007 | Chen et al. ................... | 361/683 |
| 2007/0217135 | A1 | * | 9/2007 | Chuang et al. ................ | 361/681 |
| 2007/0285886 | A1 | * | 12/2007 | Huang .......................... | 361/687 |

* cited by examiner

*Primary Examiner* — Adrian S Wilson

(74) *Attorney, Agent, or Firm* — Novak Druce Connolly Bove + Quigg LLP

(57) ABSTRACT

An electronic device includes a display, a keyboard, and a fixing element. The display includes a display surface and an opposite rear surface having a fixing structure. The keyboard has a using state and a folded state. When the keyboard is in the using state, the keyboard is positioned in front of the display, and when the keyboard is in the folded state, the keyboard is fixed on the rear surface. The fixing element is connected between the fixing structure and the keyboard and configured to cooperate with the fixing structure to enable the keyboard to change between the using state and the folded state.

11 Claims, 8 Drawing Sheets

ELECTRONIC DEVICE WITH KEYBOARD

BACKGROUND

1. Technical Field

The present disclosure relates to an electronic device with a keyboard.

2. Description of Related Art

Electronic devices, such as desktop computers, include a computer case, a display, and a keyboard. The case, the display, and the keyboard are independent of each other, and the keyboard is usually positioned on the same supporting surface as the display such as a top of a desk. Sometimes, users need not use the keyboard, but the keyboard will still occupy desktop space, which can be inconvenient for users.

What is needed is to provide a means that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will be made to the drawings to describe certain exemplary embodiments of the present disclosure.

Figure 1:
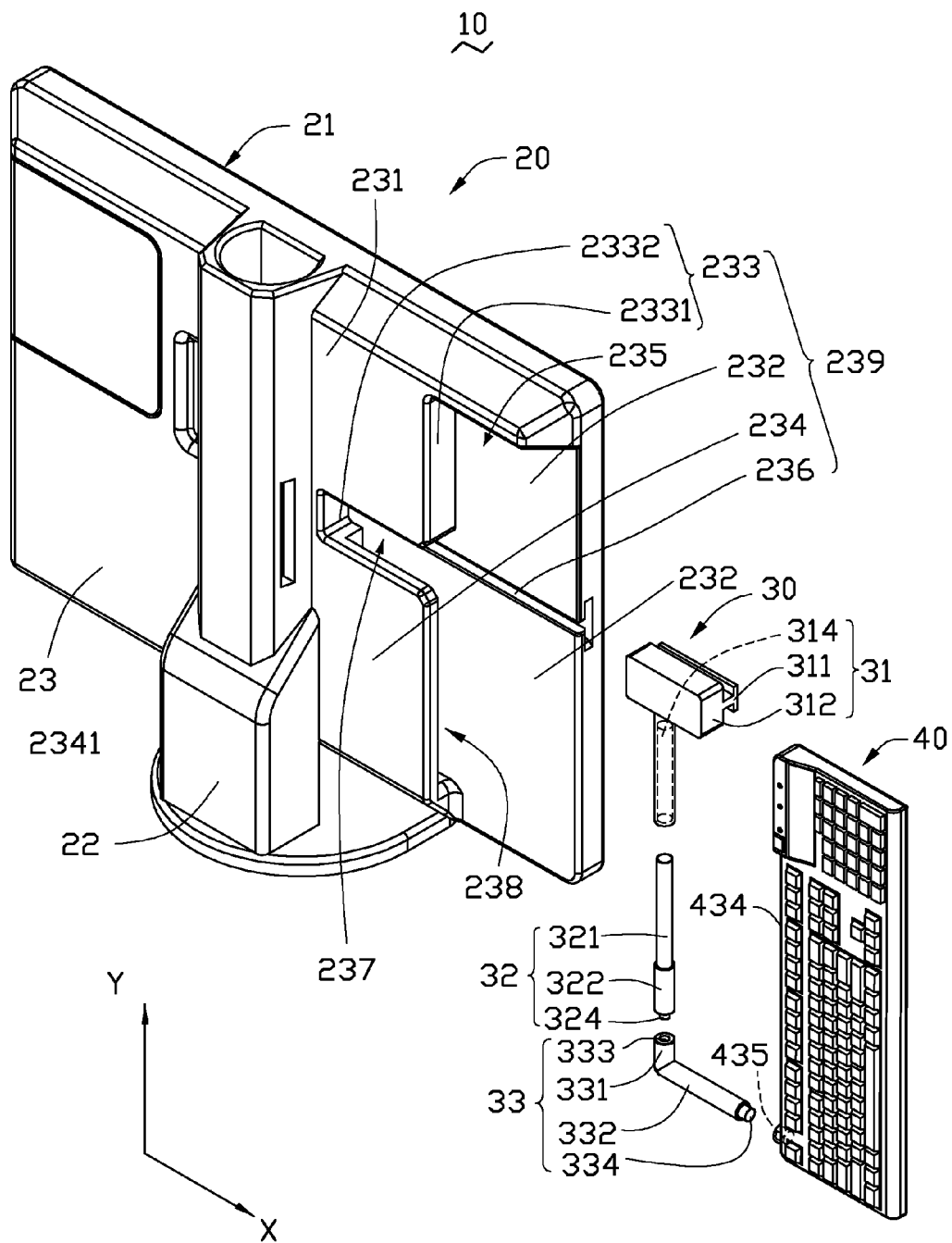
FIG. 1 is a partially exploded, isometric view of an electronic device according to an exemplary embodiment of the present disclosure, the electronic device including a keyboard.
Figure 2:
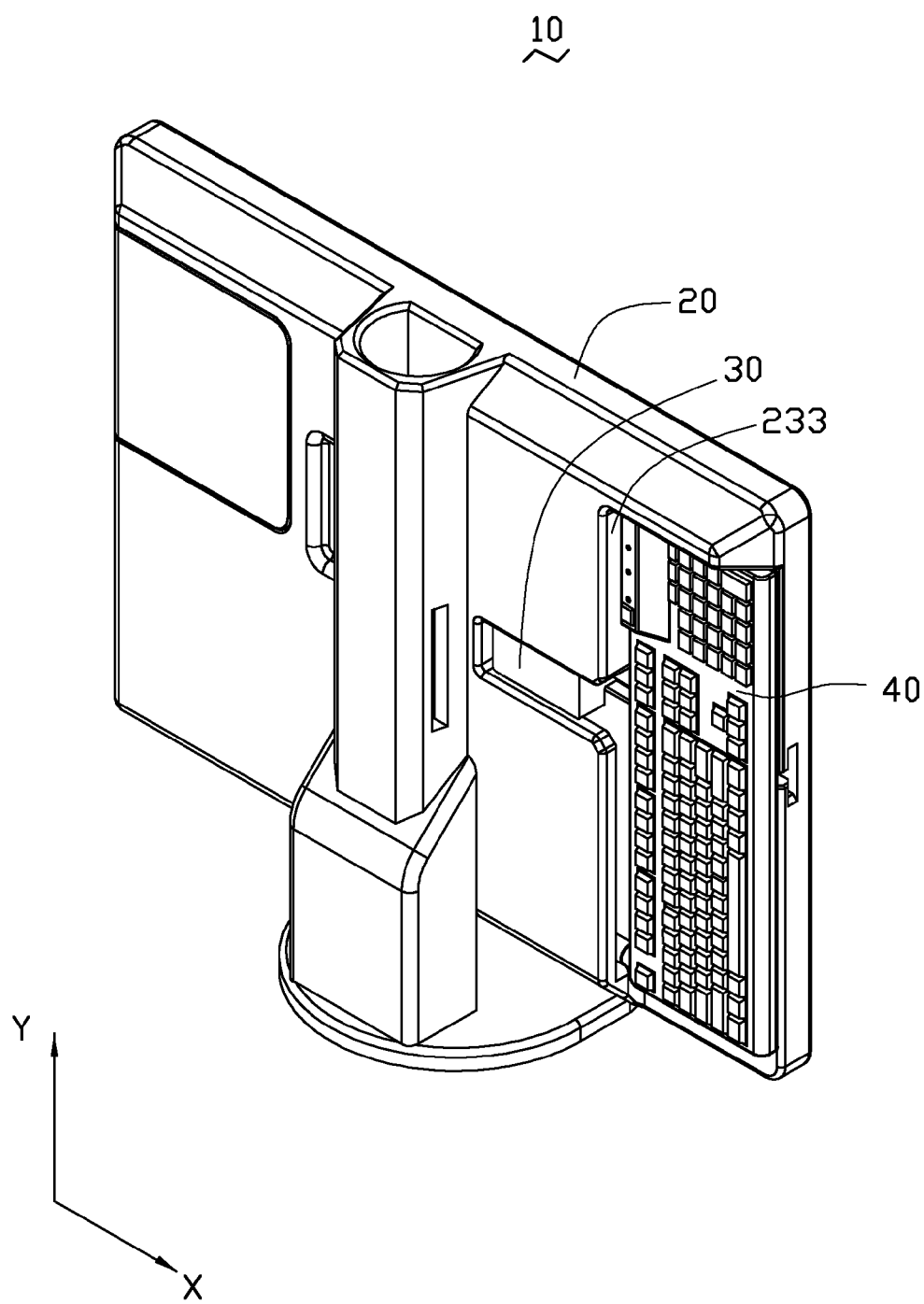
FIG. 2 is an assembled view of the electronic device of FIG. 1, showing the keyboard of the electronic device in a folded state.
Figure 3:
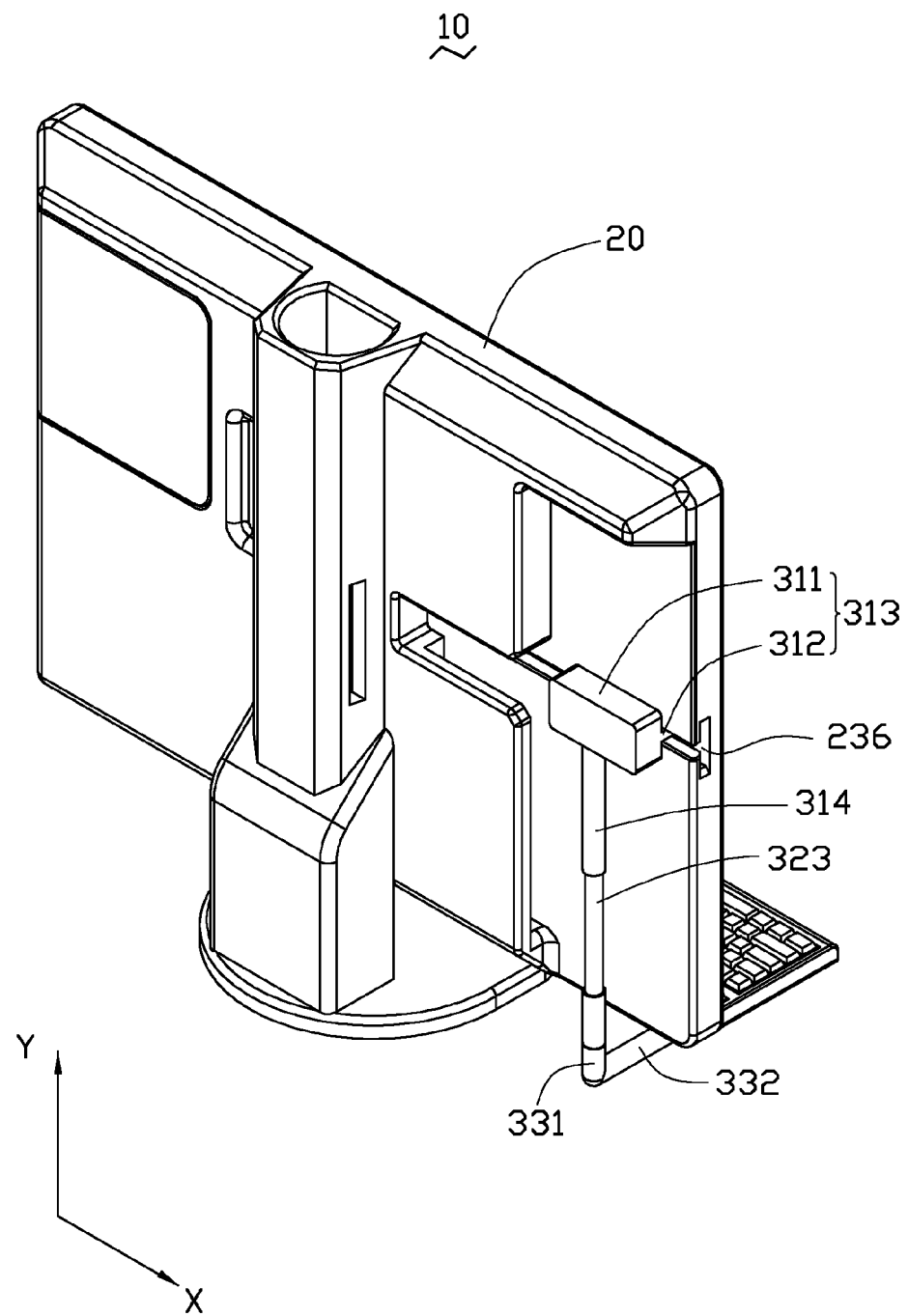
FIG. 3 is an isometric view of the electronic device of FIG. 1, showing the keyboard of the electronic device in a using state.

An exemplary embodiment of the present disclosure provides an electronic device 10. Referring to FIG. 1, FIG. 2, and FIG. 3, the electronic device 10 can be for example a desktop computer, and includes a display 20, a keyboard 40, and a fixing element 30. The display 20 includes a display surface 21 configured to display images, an opposite rear surface 23, a base 22 fixed on the rear surface 21 to support the display 20, and a fixing structure 239 defined at the rear surface 23. The keyboard 40 has a folded state and a using state. When the keyboard 40 is in the folded state, the keyboard 40 is fixed on the rear surface 21 by the fixing structure 239, and when the keyboard 40 is in the using state, the keyboard 40 is positioned in front of the display surface 21 for providing an input interface to users. The fixing element 30 and the fixing structure 239 are configured to cooperate with each other to enable the keyboard 40 to change between the folded state and the using state. In one embodiment, the electronic device 10 can be an all-in-one personal computer, and the display 20 further acts as a computer case.

The fixing structure 239 includes a first main surface 231 being a part of the rear surface 23, a second main surface 232 parallel to the first main surface 231, connection surfaces 233 connecting the first main surface 231 and the second main surface 232, a sliding groove 236 defined on the second main surface 232, and an extending plate 234 extending from the first main surface 231 and facing a part of the second main surface 232. The first sliding portion 236 extends along a horizontal direction and has a T shaped cross-section. The connection surfaces 233 include a first L shaped step 2331 and a second L shaped step 2332 connecting with a side of the first L shaped step 2331. The first step 2331 provides an abutting side wall abutting a corner of the keyboard 40 and cooperates with the second main surface 232 to form a first receiving space 235 for receiving the keyboard 40. The second step 2332 and an adjacent part of the second main surface 232 form a second receiving space 237, and the extending plate 234 and a corresponding part of the second main surface 232 form a third receiving space 238. The second and the third receiving spaces 237 and 238 are configured to receive the fixing element 30.

The fixing element 30 includes a first slider 31, a second slider 32, and an L shaped rotation portion 33. The first slider 31 is configured to slide in the sliding groove 236 to drive the fixing element 30 to move along the horizontal direction X. The first slider 31 includes a first base portion 312, a sliding block 311 connected to a side surface of the first base portion 312 and received in the sliding groove 236, and a hollow pole 314 connected to a bottom surface of the first base portion 312 and extending along a vertical direction Y. In one embodiment, the sliding block 311 has a T shaped cross-section corresponding to the sliding groove 236.

The second slider 32 is configured to slide in the hollow pole 314 to drive the keyboard 40 to move along the vertical direction Y. The second slider 32 includes a second base portion 322, a sliding bar 321 connected to a top end of the second base portion 322, and a first pivot portion 324 defined at a bottom end of the second base portion 322. At least a part of the sliding bar 321 is received in the hollow pole 314. The first pivot portion 324 is configured to pivotably engage with the rotation portion 33. In one embodiment, the first pivot portion 324 is a first shaft.

The rotation portion 33 includes a first bar 331, a second bar 332 connected to the first bar 331, a first pivot hole 333 formed on an end of the first bar 331 away from the second bar 332, and a second shaft 334 formed on an end of the second bar 332 away from the first bar 331. The first pivot hole 333 receives the first pivot portion 324, and the keyboard 40 includes a second pivot hole 435 receiving the second shaft 334.

Figure 4:
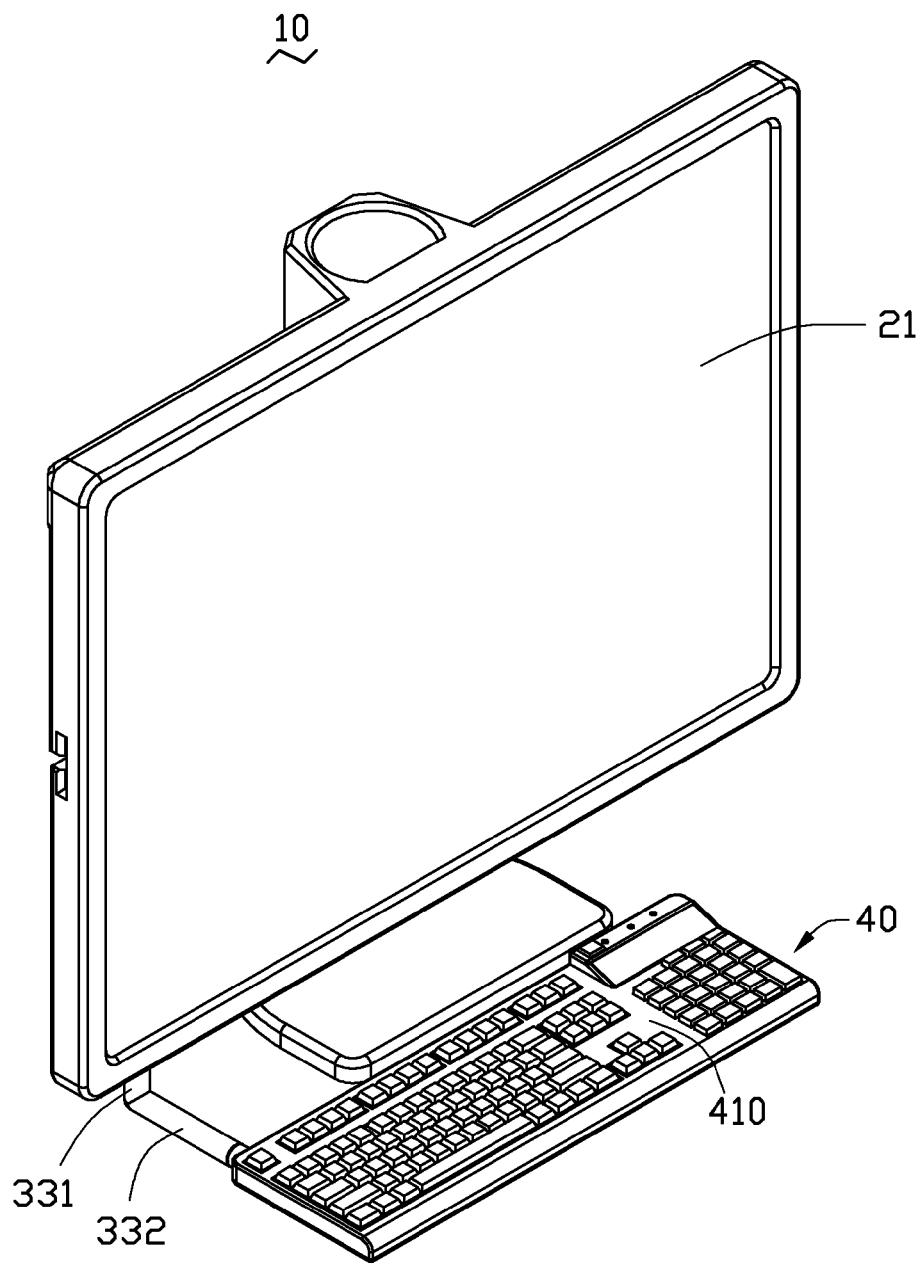
FIG. 4 is an isometric view of the electronic device of FIG. 3 but viewed from another angle.

Referring also to FIG. 4, when the keyboard 40 is in the using state, the keyboard 40 is positioned in front of the display surface 21 with an input surface 410 substantially parallel to a horizontal plane and substantially perpendicular to the display surface 21. The sliding block 311 is initially located at a first end of the sliding groove 236, and the sliding bar 321 is partly received in the hollow pole 314.

Figure 5:
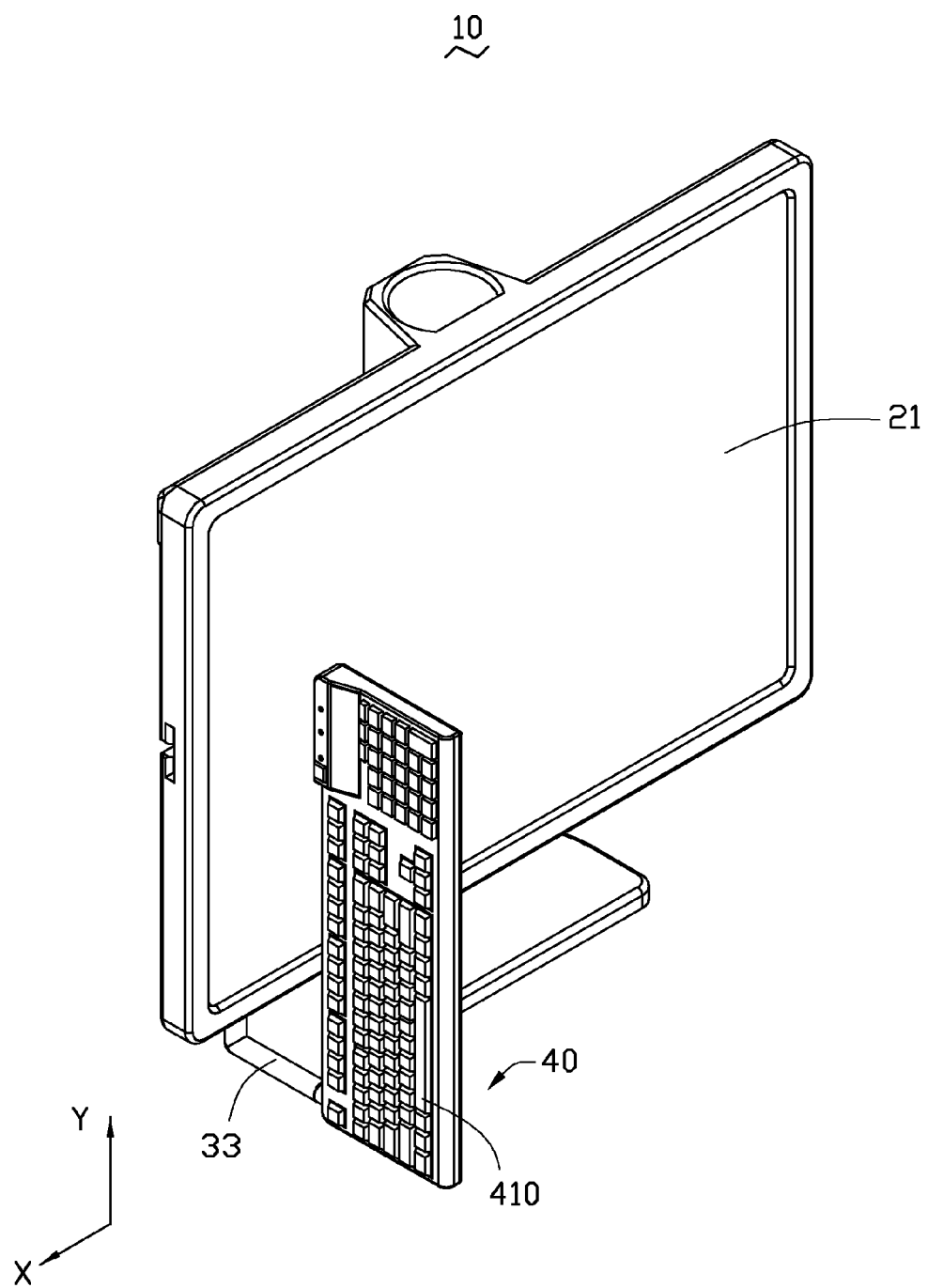
FIGS. 5-8 are assembled views of the electronic device of FIG. 1, showing the keyboard of the electronic device in different states between the folded state and the using state.
Figure 6:
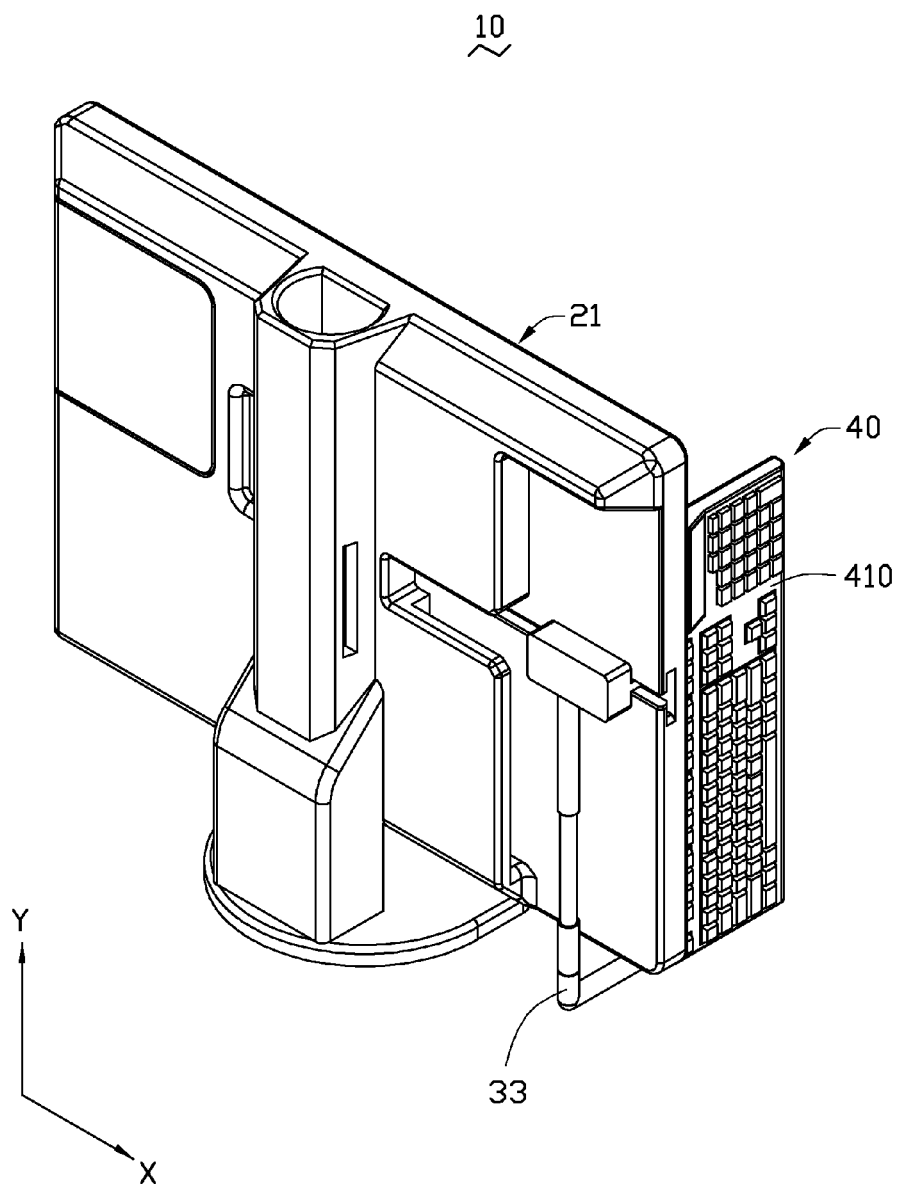
Figure 7:
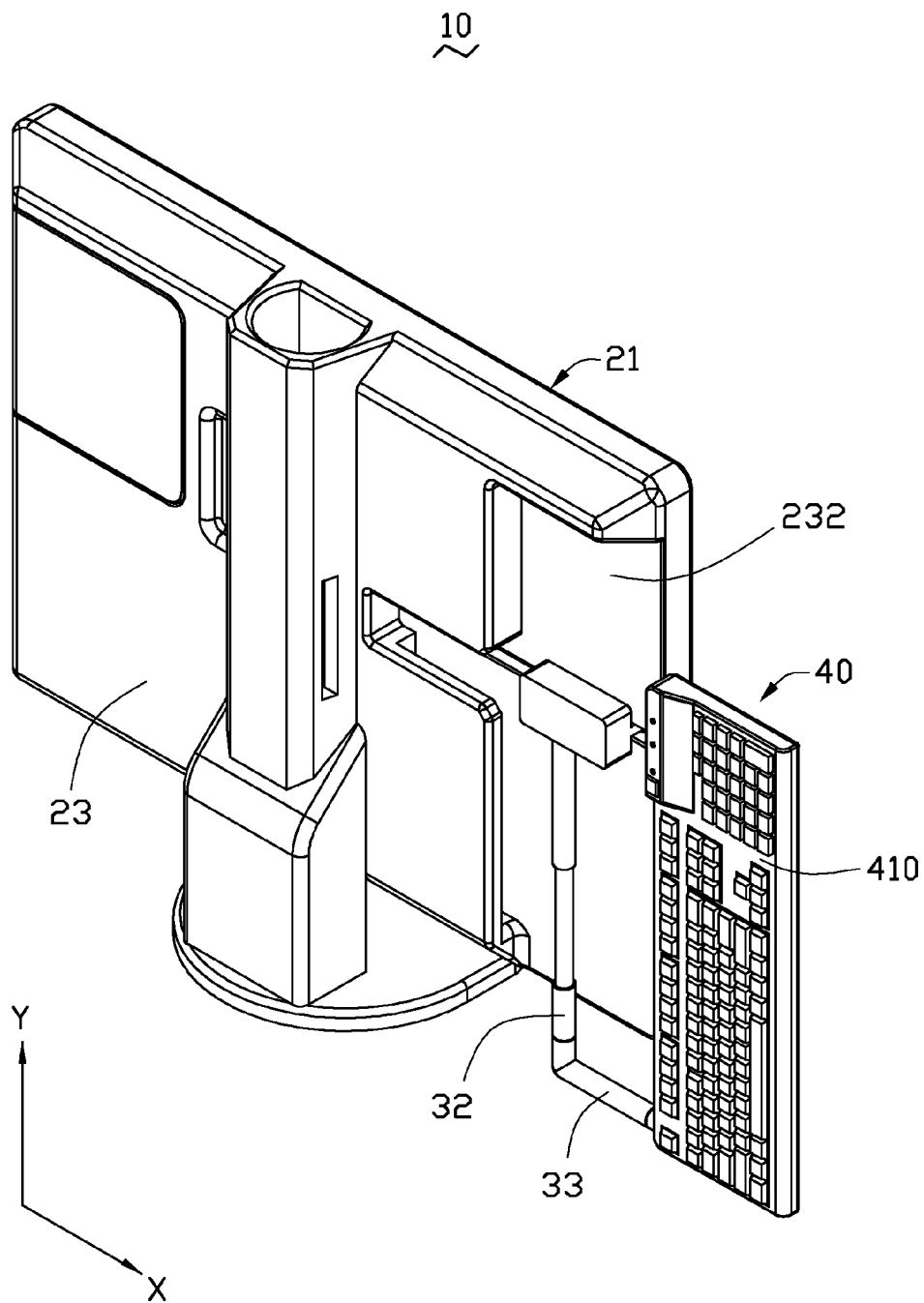

When the keyboard 40 is not in use it can be folded away by, referring also to FIG. 5 and FIG. 6, firstly, turning the keyboard 40 about the second bar 332 by 90 degrees, such that the keyboard 40 stands at the front of the display 20 and the input surface 410 is substantially perpendicular to the horizontal plane. Secondly, referring to FIG. 6 and FIG. 7, turn the rotation portion 33 about the second slider 32 by 90 degrees, such that the keyboard 40 stands at the back of the display 20 and the input surface 410 is substantially perpendicular to the horizontal plane and substantially parallel to the display surface 21. Thirdly, referring to FIG. 7 and FIG. 8, move the second bar 32 to slide in the hollow pole 314 in order to move the keyboard 40 and the rotation portion 33 up until the second bar 321 is wholly received in the hollow pole 314. Fourthly, referring to FIG. 8 and FIG. 2, move the first block 311 to slide in the sliding groove 236 to drive the fixing element 30 with the keyboard 40 to move along the negative X direction until the keyboard 40 is received in the first receiving space 235. At the same time, the first slider 31 is received in the second receiving space 237, and the second slider 32 and the rotation portion 33 are received in the third receiving space 238.

Figure 8:
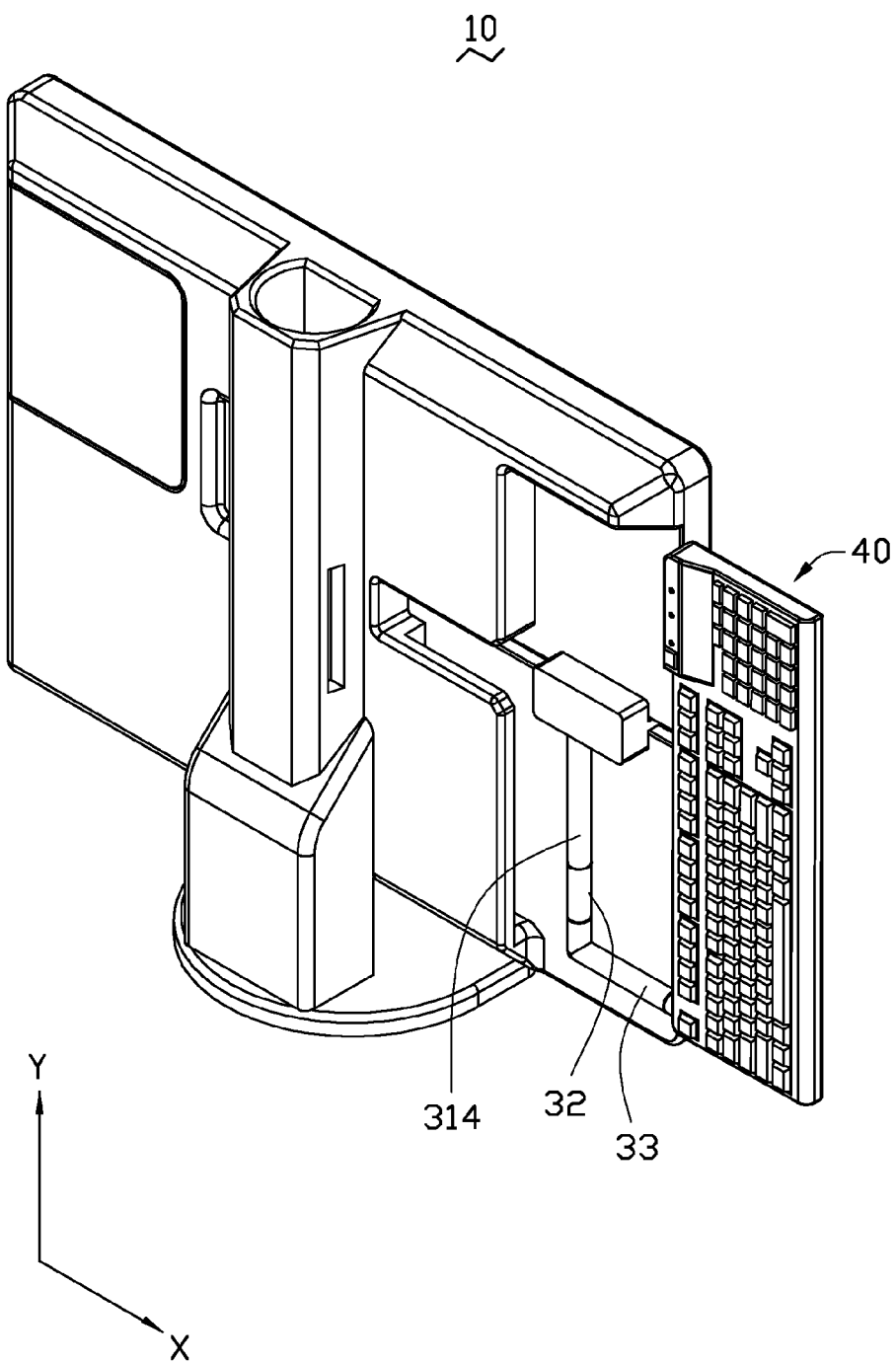

Referring also to FIG. 2 and FIG. 8, when the keyboard 40 is folded away but needed for use, a user may firstly, move the first block 311 to slide in the sliding groove 236 to drive the fixing element 30 to move along the horizontal direction until the keyboard 40 disengages from the first receiving space 235. Secondly, referring to FIG. 7 and FIG. 8, push the sliding bar 321 to slide in the hollow pole 314 to move the keyboard 40 down. Thirdly, referring to FIG. 7 and FIG. 6, turn the rotation portion 33 about the first pivot portion 324 of the second slider 32 90 degrees, such that the keyboard 40 stands at the front of the display 20 and the input surface 410 is substantially perpendicular to the horizontal plane and the display surface 21. Fourthly, referring to FIG. 3 and FIG. 6, turn the keyboard 40 about the second shaft 334 90 degrees, such that the keyboard 40 is positioned at the front of the display 20 and the input surface 410 is substantially parallel to the horizontal plane.

In summary, when the keyboard 40 is not in use it can be folded up at the rear surface 23, saving space.

It is to be further understood that even though numerous characteristics and advantages of preferred and exemplary embodiments have been set out in the foregoing description, together with details of the structures and functions of the embodiments, the disclosure is illustrative only; and changes may be made in detail, especially in matters of shape, size and arrangement of parts within the principles of the present disclosure to the full extent indicated by the broad general meaning of the terms in which the appended claims are expressed.

What is claimed is:

1. An electronic device, comprising:
   a display comprising a front surface is configured to display images and a rear surface opposite to the front surface the rear surface comprising a fixing structure;
   a keyboard having a using state and a folded state; and
   a fixing element connected the fixing structure and the keyboard, the fixing element configured to cooperate with the fixing structure to enable the keyboard to change between the using state and the folded state, wherein when the keyboard is in the using state, the keyboard is positioned in front of the display, and when the keyboard is in the folded state, the keyboard is fixed on the rear surface;
   wherein the fixing structure comprises a sliding groove, and the fixing element comprises a first slider configured to slide in the sliding groove to drive the fixing element with the keyboard to move along a horizontal direction;
   wherein the first slider comprises a first base portion, a sliding block connected to a side surface of the first base portion, and a hollow pole connected to a bottom surface of the first base portion, and the sliding block is received in the sliding groove and configured to slide in the sliding groove;
   wherein the fixing element further comprises a second slider configured to slide in the hollow pole to drive the second slider and the keyboard to move along a vertical direction.

2. The electronic device of claim 1, wherein the second slider comprises a second base portion and a sliding bar connected to a top end of the second base portion and configured to slide in the hollow pole, and at least a part of the sliding bar is received in the hollow pole.

3. The electronic device of claim 2, wherein the second base portion defines a first pivot portion at a bottom end of the second base portion, the fixing element further comprises an L shaped rotation portion, one end of the rotation portion is pivotably engaged to the first pivot portion, and the other end of the rotation portion is pivotably engaged with the keyboard.

4. The electronic device of claim 3, wherein the first pivot portion is a first shaft, and the rotation portion comprises a first pivot hole receiving the first shaft.

5. The electronic device of claim 4, wherein the rotation portion further comprise a second shaft, and the keyboard comprise a second pivot hole receiving the second shaft.

6. An electronic device, comprising:
   a display comprising a display surface and an opposite rear surface, the rear surface defining a fixing structure and a first receiving space;
   a keyboard having a using state and a folded state; and
   a fixing element connected between the fixing structure and the keyboard, the fixing element configured to cooperate with the fixing structure to enable the keyboard to change between the using state and the folded state, wherein when the keyboard is in the using state, the keyboard is positioned in front of the display, and when the keyboard is in the folded state, the keyboard is received in the first receiving space;
   wherein the rear surface comprise a first main surface, a second main surface parallel to the first main surface, and at least one connection surface connected between the first main surface and the second main surface, and the first receiving space is defined by the second main surface and the at least one connection surface;
   wherein the fixing structure comprises a sliding groove defined in the second main surface, and the fixing element comprises a first slider configured to slide in the sliding groove so as to drive the fixing element with the keyboard to move along a horizontal direction;
   wherein the first slider comprises a first base portion, a sliding block connected to a side surface of the first base portion, and a hollow pole connected to a bottom surface of the first base portion, and the sliding block is received in the sliding groove;
   wherein the fixing element further comprises a second slider configured to slide in the hollow pole to drive the second slider and the keyboard to move along a vertical direction.

7. The electronic device of claim 6, wherein the second slider comprises a second base portion, a sliding bar connected to a top end of the second base portion, and at least a part of the sliding bar is received in the hollow pole.

8. The electronic device of claim 7, wherein the second base portion defines a first pivot portion at a bottom end of the second base portion, the fixing element further comprises an L shaped rotation portion, one end of the rotation portion is pivotably engaged with the first pivot portion, and the other end of the rotation portion is pivotably engaged with the keyboard.

9. The electronic device of claim 8, wherein the rear surface further defines a second receiving space configured to receive the first slider and a third receiving space configured to receive the second slider and the rotation portion, when the keyboard being in the folded state.

10. The electronic device of claim 9, wherein the at least one connection surface comprises a first L shaped step portion and a second L shaped step portion, the first receiving space is defined by the first L shaped step portion and the second main surface, and the second receiving space is defined by the second L shaped step portion and the second main surface.

11. The electronic device of claim 9, wherein the rear surface further comprises an extending plate extending from the first main surface and facing the second main surface, and the second receiving space is defined by the extending plate and the second main surface.

* * * * *